(No Model.)

A. D. McLELLAN.
MILK PAIL.

No. 596,376. Patented Dec. 28, 1897.

WITNESSES:
William P. Goebel
Isaac B. Wrenz

INVENTOR
A. D. McLellan
BY Munn & Co.
ATTORNEYS.

UNITED STATES PATENT OFFICE.

ANGUS D. McLELLAN, OF CRYSTAL, NORTH DAKOTA.

MILK-PAIL.

SPECIFICATION forming part of Letters Patent No. 596,376, dated December 28, 1897.

Application filed April 16, 1897. Serial No. 632,458. (No model.)

*To all whom it may concern:*

Be it known that I, ANGUS D. MCLELLAN, of Crystal, in the county of Pembina and State of North Dakota, have invented a new and Improved Milk-Pail, of which the following is a full, clear, and exact description.

This invention is an attachment for milking-pails of such construction as to effectually serve to separate the milk from the impurities contained in the milk and prevent extraneous impurities from dropping into the milk during the milking operation.

This specification is the disclosure of one form of my invention, while the claims define the actual scope of the conception.

Reference is to be had to the accompanying drawings, forming a part of this specification, in which similar characters of reference indicate corresponding parts in all the figures.

Figure 1:
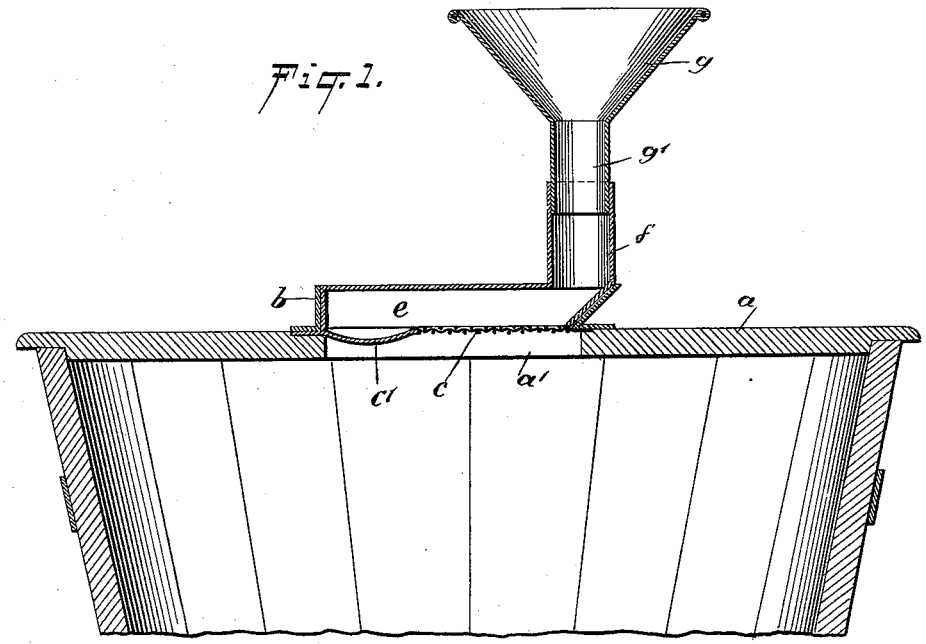
Figure 2:
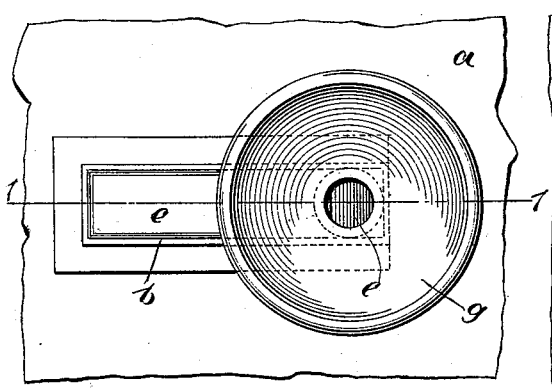
Figure 3:
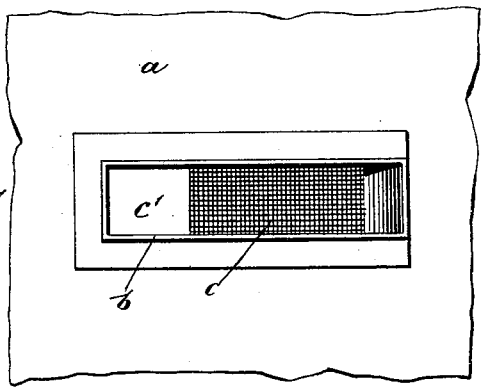

Figure 1 is a sectional view of the invention, showing it in use. Fig. 2 is a plan view of the invention; and Fig. 3 is a view of the strainer and its casing, with the funnel and the cover for the strainer.

The bucket or pail is provided with a cover $a$, wherein is formed an elongated opening $a'$, surrounded by a parallelogram-shaped metallic flange $b$, perpendicular throughout its length, excepting at one end, which is inclined outward at an angle of about forty-five degrees. Stretched over the opening $a'$ is a sieve $c$ and a plate $c'$, which plate has its upper surface depressed to form a receptacle for the impurities that are separated from the milk. The sieve $c$ and the plate $c'$ jointly cover the opening $a$, the sieve occupying approximately two-thirds the area of the opening $a'$. Friction-tight in and yet easily removable from the space inclosed by the flange $b$ is a casing $e$. One end of the casing $e$ is inclined or beveled to conform to the inclined end of the flange $b$. The upper side of the casing $e$ has an opening and a perpendicular tube $f$ standing around the opening, the tube $f$ being directly over the inclined end of the casing $e$. Fitted within the upper end of the tube $f$ is the stem $g'$ of the funnel $g$.

In using the device, the parts being arranged as shown in Figs. 1 and 2, the stream of milk from the teats of the cow is directed into the funnel $g$. The milk is thrown forcibly against the inclined end of the flange $b$, which deflects the milk horizontally over the sieve $c$. The milk drops and passes through the sieve; but impurities contained within the milk are first arrested by the sieve, and by the action of the inclined stream of milk the impurities are thrown toward the plate $c'$, in the concavity or depression of which the impurities are received and held. It is essential, therefore, that there be an inclined surface for the milk to strike, so as to direct the milk at an inclination against the sieve $c$, and thus throw the impurities upon the plate $c'$. The closure or top $a$ for the pail prevents dirt from falling into the pail.

Having thus described my invention, I claim as new and desire to secure by Letters Patent—

1. A straining apparatus having a support with an opening therein, a concave plate secured to the support and extending over a portion of the opening, a sieve located directly adjacent to the concave plate and extending over the remaining portion of the opening, a flange extending upward from the edges of the opening, a portion of the flange being inclined downward and inward toward the adjacent edge of the opening, a casing having an open bottom, the casing being snugly fitted within the space inclosed by the flange and having an inclined end lying snug against the inclined portion of the flange, such inclined end of the casing leading to the sieve at the edge opposite the concave plate, and a tube leading to the casing and discharging upon the concave end thereof whereby liquid directed through the tube will engage such concave end and be deflected laterally over the sieve toward the concave plate.

2. A straining apparatus having a concave plate, a sieve adjacent thereto, a casing having an open bottom, the casing being arranged over the concave plate and sieve and having one end inclined downward and inward toward the sieve, such end being located opposite to the concave plate, and a tube leading to the casing, the tube discharging directly upon the inclined end of the casing so that liquid projected through the tube will strike said inclined end and be deflected laterally over the sieve toward the concave plate.

ANGUS D. McLELLAN.

Witnesses:
D. J. VAN JARETE,
WILLIAM McINTOSH.